Figure 1:
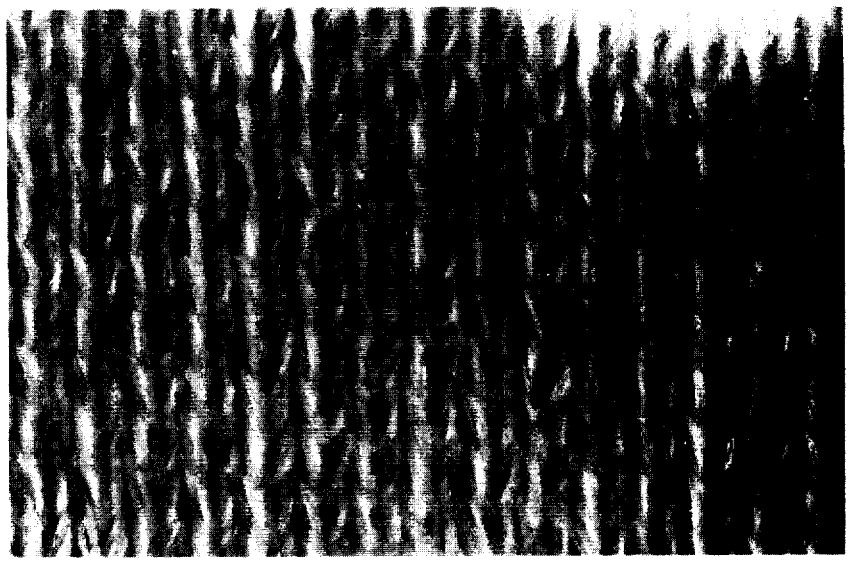
Figure 2:
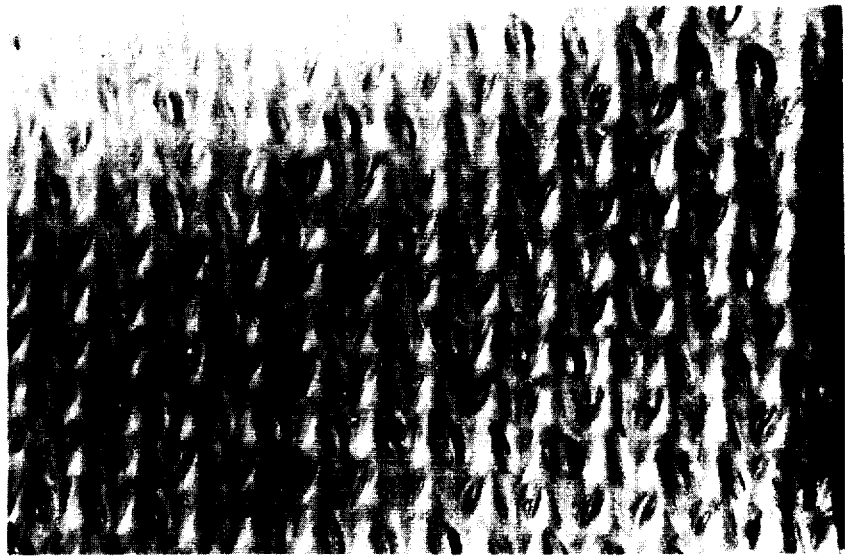
Figure 3:
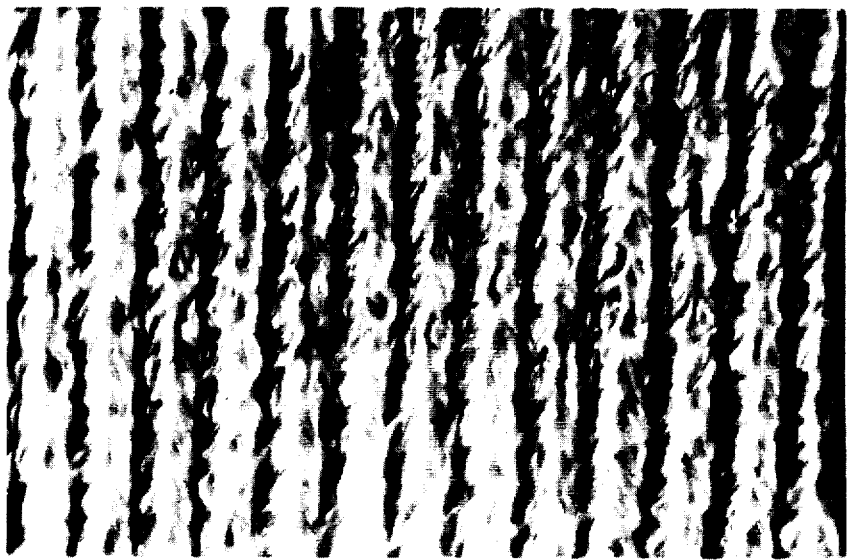
Figure 4:
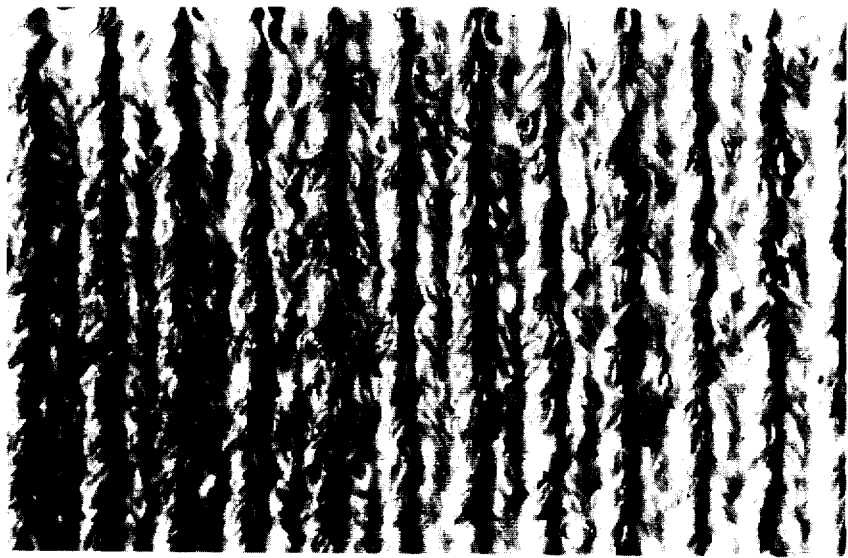
Figure 5:
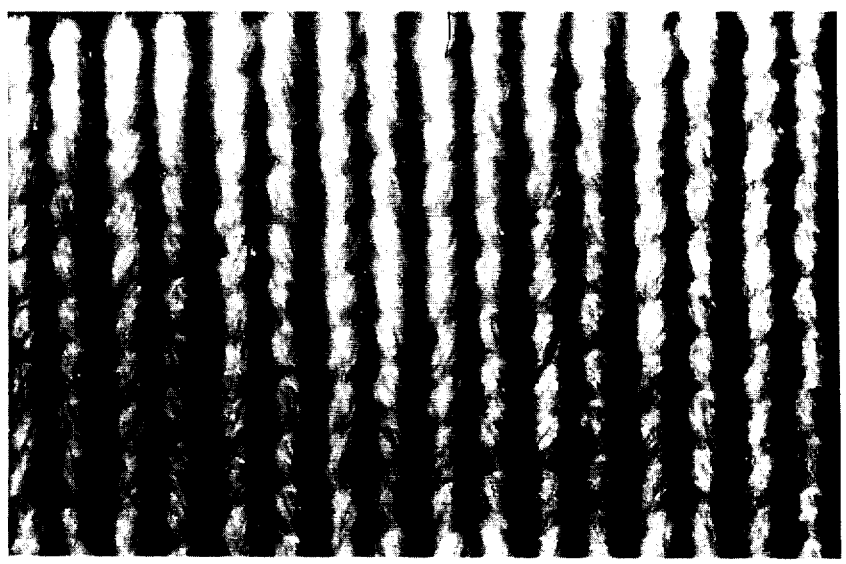
Figure 6:
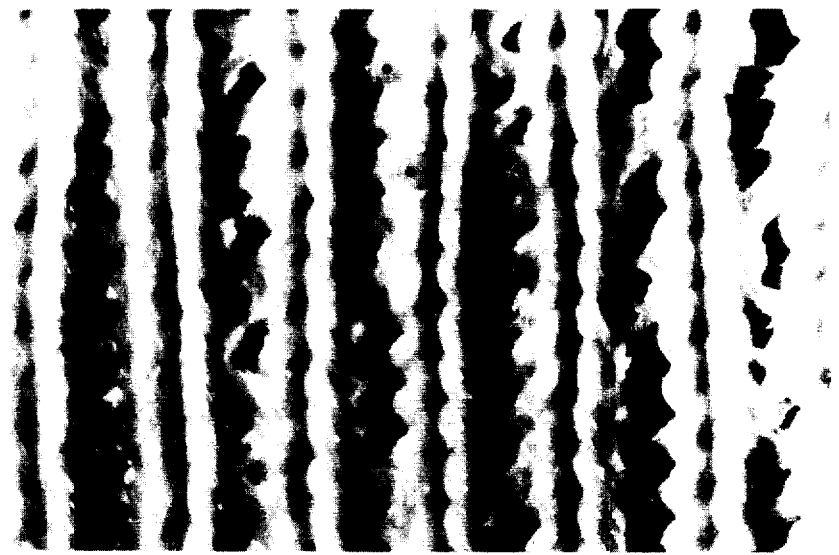
Figure 7:

United States Patent [19]
Sakairi et al.

[11] 3,892,425
[45] July 1, 1975

[54] AIR BAG
[75] Inventors: Hiroshi Sakairi; Tetuyosi Tezuka; Noboru Watanabe, all of Kyoto, Japan
[73] Assignee: Gumze Ltd., Japan
[22] Filed: Dec. 26, 1972
[21] Appl. No.: 318,479

[30] Foreign Application Priority Data
Dec. 23, 1971  Japan.................................. 47-2602

[52] U.S. Cl. ......... 280/150 AB; 117/98; 117/135.5; 117/138.8 N; 117/161 UF; 117/138.8 F; 117/161 KP; 161/89; 161/92; 161/159; 161/160; 206/DIG. 30
[51] Int. Cl. ...... B60r 21/10; B32b 5/04; B32b 5/18
[58] Field of Search .............. 161/92, 89, 159, 160; 280/150 AB; 206/DIG. 30; 117/63, DIG. 7, 98, 138.8 N, 135.5, 161 UF, 161 KP; 260/2.5 AY; 182/137; 244/138 R

[56] References Cited
UNITED STATES PATENTS

| | | | |
|---|---|---|---|
| 2,739,919 | 3/1956 | Artzt | 156/232 |
| 3,100,721 | 8/1963 | Holden | 117/63 |
| 3,214,290 | 10/1965 | Larner | 260/2.5 AY |
| 3,296,016 | 1/1967 | Murphy | 117/63 |
| 3,451,693 | 6/1969 | Carey | 280/150 AB |
| 3,511,519 | 5/1970 | Martin | 280/150 AB |
| 3,524,753 | 8/1970 | Sharp | 117/63 |
| 3,638,755 | 1/1972 | Sack | 280/150 AB |
| 3,650,880 | 3/1972 | Tienifer | 161/89 |
| 3,676,288 | 7/1972 | Hoyle | 161/158 |
| 3,680,886 | 8/1972 | Mazelsky | 280/150 AB |
| 3,692,708 | 9/1972 | Meisert | 161/159 |
| 3,705,645 | 12/1972 | Konen | 161/92 |
| 3,799,574 | 3/1974 | Bonn | 280/150 AB |
| 3,807,754 | 4/1974 | Rodenbach | 280/150 AB |

Primary Examiner—George F. Lesmes
Assistant Examiner—Ellis P. Robinson
Attorney, Agent, or Firm—Armstrong, Nikaido & Wegner

[57] ABSTRACT

A vehicle safety device to be usually installed in a vehicle in a folded form and inflatable within an appropriate period of time necessary to protect the occupant from a collision against the interior components of the vehicle. The device, namely air bag, is composed of a composite material comprising an air permeable and stretchable knitted fabric and a coating layer of elastomer or analogue thereof formed on the surface of the fabric and having microporous openings. When the internal pressure exceeds a predetermined level in an event of collision, the stretching stitches of the fabric are brought out of balance with the coating layer to form new openings other than the microporous openings, permitting an increased amount of pressurized gas to be released from both openings throughout the bag and causing the bag to reduce the energy of impact by virtue of deformation of the bag due to free stretching.

4 Claims, 7 Drawing Figures

AIR BAG

BACKGROUND OF THE INVENTION

The present invention relates to an air bag for protecting the occupant of vehicles such as automobile, more particularly to an air bag made of a novel material and having improved ability to absorb energy and to reduce impact so as to assure improved safety.

Air bags have already been provided to protect the occupant in vehicles. These air bags are adapted to be inflated instantaneously with high pressure gas in an event of collision to prevent the movement of the occupant for safety. For this purpose, the air bag is generally made of an air impermeable material and formed with an opening from which the high pressure gas introduced into the bag is exhausted, whereby the energy resulting from the occupant striking against the bag upon a collision and the energy of the subsequent pressing movement are absorbed to reduce the impact.

Thus the conventional device requires a strong material, namely a hard and thick material which is capable of withstanding the injection pressure of high pressure gas. Accordingly, the bag has very little or no air permeability when inflated and, if a bag made of a tough material is to be inflated, it will need a higher internal pressure than would otherwise be necessary, subjecting the occupant to inevitable rebound. Moreover, releasing the gas from the exhaust opening will collapse the bag earlier and render the bag less effective. The hard and tough material, furthermore, tends to injure the occupant. Since the material has to be stitched tightly to avoid possible fraying or bursting at the stitched portion, the hard and rough stitches formed involve the hazard of causing injuries to the occupant when the bag is inflated. In addition, the bag becomes bulky in its entirety and it is difficult to keep it in a compact form. Although the air bag per se appears theoretically effective, the practical construction of the same has many difficult problems.

By the air bag herein referred to is meant means for providing a bodily restraint for the occupant which does not require any action by the occupant.

The problems experienced with the conventional air bags will be summarized as follows;

(1) Effect of air bag to mitigate deceleration, (2) rapid variation of air pressure, (3) dimensions of air bag, (4) selection of material of air bag, (5) inflation time, (6) prevention of rebound, (7) prevention of bottoming, (8) internal pressure of bag, (9) impactive variations of air pressure and sonic pressure within the compartment of vehicle, (10) toxicity and inflammability of gas generator, (11) sensitivity and mechanism of sensor, (12) quality control, prevention of erroneous explosion, aging, etc.

U.S. Pat. No. 3,451,693 discloses an air bag formed with a given number of orifices for releasing fluid. With the device disclosed, however, it is difficult to reduce the internal pressure of the bag through the outflow of the fluid in such manner as to mitigate impact and thereby assure safety, because if the internal pressure reduces greatly, the air bag will fail to afford any safety. Furthermore the device must be free of breakage and damage. These are problems encountered in the art, especially in the case of a device of the gas release type.

SUMMARY OF THE INVENTION

An object of this invention is to provide an air bag of the gas release type made of a newly developed material for absorbing the energy resulting from the occupant striking against the bag in an event of collision, the air bag being made of a composite material comprising an air permeable and stretchable knitted fabric and a coating layer of elastomer or analogue thereof formed on the surface of the fabric and having microporous openings, so that when the internal pressure exceeds a predetermined level in an event of collision, the stretching stitches of the fabric are brought out of balance with the coating layer to form new openings other than the microporous openings, permitting an increased amount of pressurized gas to be released from both openings throughout the bag and causing the bag to reduce the energy of impact by virtue of deformation of the bag due to free stretching.

Another object of this invention is to provide an air bag made of a composite material comprising an elastic knitted fabric serving as a base material having stitches stretchable under a given internal pressure and a microporous coating layer of elastomer formed uniformly on the fabric, the porosity of the coating layer being variable as desired with respect to the size and number of the micropores.

These and other objects, features and advantages of this invention will become more apparent from the following description with reference to the photographs showing examples only for illustrative purposes.

BRIEF DESCRIPTION OF THE PHOTOGRAPHS

Photograph 1 shows the surface of a double tricot 30d having air permeability of 107 cc/cm$^2$/sec;

Photograph 2 shows the changes in the fabric of Photograph 1 when it is subjected to gas pressure;

Photograph 3 shows the surface of a fabric knitted of 75d finished yarns and having air permeability of 130 cc/cm$^2$/sec;

Photograph 4 shows the changes in the fabric of Photograph 3 when it is subjected to gas pressure;

Photograph 5 shows the surface of a circular rib fabric 110d/2 having air permeability of 54 cc/cm$^2$/sec;

Photograph 6 shows the changes in the fabric of Photograph 5 when it is subjected to gas pressure;

Photograph 7 shows the surface of a material for a bag according to the second feature of this invention, all the photographs being taken at a magnification of 20X.

DESCRIPTION OF THE INVENTION

Although the material used for air bags heretofore publicly tested was plain-woven fabric or canvas made of 100% vinylon, we used only knitted fabrics for experiments. Woven fabrics are composed of warp yarns and weft yarns intersecting at right angles in a tight texture, are durable, capable of retaining its shape and resistant to external forces acting in the directions of warp yarns and weft yarns (but easy to stretch in bias direction), whereas knitted fabrics which are mainly used as underwear, socks, coats and for interior decoration, etc. are formed of continuous loops and are soft and stretchable a great deal, have resistance to creasing, fit well, do not restrain the movement of human body, and possess high air permeability because they are composed of loops. Because of these properties, knitted fabrics are superior to woven fabrics as materials for the air bag. Nonwoven fabric, synthetic leather, bonded fabric, etc. may possibly be usable as materials for the air bag, but they are not suitable for this purpose although advantageously employable as a core material, shoes and brief cases.

When brought into contact with the human body, an air bag made of knitted fabric which is stretchable readily fits the body without exerting an impactive force locally. Further when the human body strikes against the air bag, the energy of movement of the body will be absorbed by the bag due to the compression or release of air. Being highly stretchable under an external force, the air bag made of knitted fabric will readily expand, resulting in a relatively small increase in the pressure.

It is well known that the stress on the constituent fabric of the air bag is proportional to the internal pressure and diameter. Thus, the lower the internal pressure, the smaller will be the stress on the fabric. It follows therefore that the stability with respect to strength, which is essential to the air bag, will be very high if the constituent fabric is a knitted fabric. Even in the case where it has a lower strength than woven fabric, it will serve the intended purpose satisfactorily, hence very advantageous.

When the internal pressure is at a greatly increased level, rebound will take place. To prevent this, there is a need to release the air upon absorption of energy for rapid reduction of the internal pressure. In the case of woven fabric, a greater amount of air must be released because of a relatively great increase in the internal pressure. This means that a great amount of air has to be exhaused into a confined compartment of the vehicle, which will exert an adverse effect on the human body. The situation will be less serious in the case of knitted fabric.

The woven fabric which is not highly stretchable does not permit noticeable variation in air permeability due to stretch, whereas the knitted fabric which is very stretchable exhibits a greatly increased air permeability under an increased pressure because the loops or stitches of the fabric are enlarged. Accordingly, If the knitted fabric is coated with a suitable elastomer or an analogue thereof, the resulting coating will be broken locally to release the air. This will become more apparent from the accompanying photographs.

The amount of air released from the air bag is generally herein referred to as "air permeability." For example, the expression "A cc/cm$^2$/sec. at B kg/cm$^2$" means that A cc of air is released per square centimeter of surface area of the bag for 1 sec. at an internal pressure of the bag of B kg/cm$^2$. The air permeability is expressed in terms of a numerical value at the internal pressure of 1 kg/cm$^2$, which also representatively refers to the numerical value at each pressure level given by the associated air permeability-pressure curve. Thus, "A cc/cm$^2$/sec. at 1 kg/cm$^2$" also includes "B cc/cm$^2$/sec at 0.2 kg/cm$^2$".

Photograph 1 shows the surface of a double tricot fabric 30d having an air permeability of 107 cc/cm$^2$/sec. When subjected to gas pressure, the fabric gives an air permeability of 960 cc/cm$^2$/sec. as apparent from Photograph 2 in which it is seen that the gas is forced out through the loops. Photograph 3 shows a fabric knitted of 7.5d finished yarns and having an air permeability of 130 cc/cm$^2$/sec. When subjected to gas pressure, the fabric gives an air permeability of 1160 cc/cm$^2$/sec. It is seen from Photograph 4 that the resin is broken at the furrows of the fabric to permit the gas to be released from the openings.

Photograph 5 shows the surface of a circular rib fabric 110d/2 having an air permeability of 54 cc/cm$^2$/sec. Application of gas pressure gives an air permeability of 1320 cc/cm$^2$sec. As apparent from Photograph 6, stretching of the fabric and breakage in the resin greatly enhance air permeability. The air permeability can of course be varied as desired by selecting a knitted fabric of particular characteristics and an appropriate coating composition.

It is noted that being highly air permeable, the knitted fabric fails to restrain the human body (dummy) in an event of collision, permitting a bottoming phenomenon to take place, and therefore unserviceable as an air bag. Accordingly, we provide a composite material comprising a knitted fabric and a coating formed thereon to give a suitable air permeability for use as an air bag.

Suitable as materials for the air bag of this invention are knitted fabrics such as tricot fabric which are suitably air permeable, stretchable, durable and capable of adhering to resins. Examples are those made of nylon, polyester, etc. In other words, the fabrics to be used are those inflatable by the injection of gas and having a knitted structure stretchable upon impactive contact with the human body (dummy). Suitable resins for adjusting the air permeability may be those having stretchability and durability such as polyurethane elastomer resin, chlorosulfonated polyethylene resin, etc.

To coat the knitted fabric with resin, a 10 to 30% solution of resin as described above is applied uniformly over one surface of the fabric by direct coating, reverse coating, knife edge coating, etc. The composite material to be used as a material for the air bag is cut by a suitable method and then made into an air bag by stitching. A very small degree of adjustment of air permeability may be made by varying the thickness of the coating, but special care must be taken of the temperature of the resin and the thickness of the fabric, because changes in the temperature alter the properties of the resin such as viscosity, making it impossible to obtain a uniform resin coating.

The composite material comprising the knitted fabric coated with an elastomer or an analogue thereof is immersed in a water bath for the removal of solvent and foaming. After the removal of water and drying, the resulting product is used as a material for the air bag. Specific examples are given below.

EXAMPLE 1

A strong nylon 210d, 24 gauge, half tricot fabric measuring 365 $\mu$ was coated with polyurethane elastomer resin (27% solution of dimethylform) at 20°C to a thickness of 50 $\mu$ by direct roller coating. The coated fabric was then immersed in a water bath at 15°C for 15 minutes for foaming and for the removal of the solvent. Water was then removed from the fabric and dried at a temperature of not higher than 60°C for 1 hour to obtain a composite material, which was then made into an air bag. The bag had an air permeability of 100 cc/cm$^2$/sec. at pressure of 1 kg/cm$^2$.

EXAMPLE 2

A strong nylon 210d, 34 filament, 24 gauge half tricot fabric measuring 650 μ was coated with polyurethane elastomer resin (30% solution of dimethylformamide (hereinafter referred to as DMF)) at 20°C to a thickness of 52 μ by knife edge coating. The coated fabric was then immersed in a water bath at 15°C for 15 minutes for foaming and for the removal of the solvent, followed by the removal of water and drying. The resulting fabric was made into an air bag. The fabric had an air permeability of 125 cc/cm²/sec. at pressure of 1 kg/cm².

EXAMPLE 3

A woolly nylon 220d (110d/2) circular rib fabric measuring 605 μ was coated with polyurethane elastomer resin (27% solution of DMF) at 20°C to a thickness of 106 μ by knife edge coating. The coated fabric was then immersed in a water bath at 15°C for 15 minutes for foaming and for the removal of the solvent, followed by the removal of water and drying. The resulting fabric was made into an air bag. The fabric had an air permeability of 578 cc/cm²/sec. at pressure of 1 kg/cm².

EXAMPLE 4

A woolly nylon 110d/2 interlock measuring 703 μ was coated with polyurethane elastomer resin (27% solution of DMF) at 20°C to a thickness of 394 μ by knife edge coating. The coated fabric was then immersed in a water bath at 15°C for 15 minutes for foaming and for the removal of the solvent, followed by the removal of water and drying. The resulting fabric was made into an air bag. The fabric had an air permeability of 194 cc/cm²/sec. at pressure of 1kg/cm².

EXAMPLE 5

A woolly nylon 110d/2 interlock measuring 710 μ was coated with chlorosulfonated polyethylene (25% solution of toluene) at 20°C to a thickness of 356 μ by knife edge coating. After drying, the coated fabric was made into an air bag. The fabric had an air permeability of 105 cc/cm²/sec. at pressure of 1 kg/cm².

EXAMPLE 6

A strong nylon 210d, 34 filament, 24 gauge half tricot fabric measuring 638 μ was coated with chlorosulfonated polyethylene (25% solution of toluene) at 20°C to a thickness of 88 μ by knife edge coating. After drying, the coated fabric was made into an air bag. The fabric had an air permeability of 93 cc/cm²/sec. at pressure of 1 kg/cm².

EXAMPLE 7

A strong nylon 210d, 34 filament, 24 gauge half tricot fabric measuring 658 μ was coated with polyurethane elastomer resin (27% solution of DMF) at 20°C to a thickness of 440 μ by direct roller coating. The coated fabric was then immersed in a water bath for foaming and for the removal of the solvent, followed by the removal of water and drying. The resulting fabric was made into an air bag. The fabric had an air permeability of 0 cc/cm²/sec. at pressure of 1 kg/cm².

EXAMPLE 8

A strong nylon 110d/2 circular rib fabric measuring 608 μ was coated with polyurethane elastomer resin (27% solution of DMF) at 20°C to a thickness of 30 λ by reverse roller coating. The coated fabric was then immersed in a water bath at 15°C for 15 minutes for foaming and for the removal of the solvent, followed by the removal of water and drying. The resulting fabric was made into an air bag. The fabric had an air permeability of 798 cc/cm²/sec. at pressure of 1 kg/cm².

As will be apparent from the examples above, air permeabilities of 0 to 800 cc/cm²sec. were available as desired at an internal pressure of 1 kg/cm² by varying the concentration of the resin and the thickness of resin layer.

Conventionally, urethane elastomer resin is rendered microporous by adding a water soluble substance such as sodium bicarbonate ($NaHCO_3$) to the resin and subjecting the resin to wet treatment for the removal of solvent or removing solvent therefrom. By this method, however, it is difficult to render the resin macroporous, and it is almost impossible to use a foaming agent in a wet method.

According to a second feature of this invention, there is provided a composite material comprising a knitted fabric serving as a base material and a macroporous elastomer coating formed uniformly on the fabric, the fabric, more specifically, being stretchable and having stitches which can stretch or enlarge under a given internal pressure, the porosity of the elastomer coating being adjustable with respect to the size and number of the macropores.

To put in detail, a foaming agent such as sodium bicaronate which produces gas upon reaction with acid is added to a made-up urethane elastomer resin solution from which solvent can be removed by wet method and the mixture is then applied to a knitted fabric with a doctor or by roll coating, the fabric having stretchable or enargeable loops or stitches. The coated fabric is then immersed in an aqueous solution at 30°C to 50°C containing an acid substance and a solvent the same as that for the resin such as DMF, acetone or the like so as to remove the solvent from the resin solution and thereby form micropores. At this time, the foaming agent in the resin solution reacts with acid solvent to generate gas, rendering the coating resin layer macroporous uniformly. The macropores thus formed are such as can be observed with the unaided eye and the macroporous coating is integral with the base material.

We are further aware that the porosity, namely the size and number of the pores can be controlled as desired depending upon the kind of the acid substance, concentration of the solvent added thereto, temperature and the amount of the foaming agent used.

In this case, foaming of course readily takes place if the foaming agent such as sodium bicarbonate is used at a high concentration. If the foaming bath has a high temperature and if a high concentration of solvent such as DMF is used, the resulting foamed coating will be of a smaller thickness and the macropores therein tend to be larger. Conversely, at a low temperature, and at a low concentration of DMF, a thick coating will be formed with relatively small macropores. Accordingly, it is most desired that the foaming bath be used at 30° to 50°C and that DMF have a concentration of 60 to 75% when 10% of sodium bicarbonate is used. The principal reason why DMF is used is that if the solvent removing acid bath contains the same solvent as that in the resin solution, the removal of solvent will be effected mildly, without permitting the urethane elastomer resin to solidify rapidly at its surface, to form micropores, through which the acid solution easily penetrates into the resin. Consequently, the acid will react with the foaming agent with greater ease.

Thus it is to be understood that the relation between the amount of sodium bicaronate and the proportions of water, DMF and acid such as HCl is critical to form the desired foamed coating layer. Although the time taken for the removal of solvent under such conditions may vary depending upon other conditions, foaming will be almost completed in about 1 to 10 minutes.

After the completion of foaming, the product is completely neutralized in another bath already known for neutralization of acid. Subsequent washing with water gives the desired composite material. The composite material thus prepared has a coating layer having micropores which are peculiar to wet treatment and which can be controlled as desired with respect to their size and number by selecting the foaming conditions. It is therefore possible to obtain a material of soft hand by using a somewhat hard urethane elastomer resin inasmuch as the air permeability is thus controllable.

The resulting composite material is cut by a suitable method and sewn into an air bag.

When the internal pressure of the air bag exceeds a predetermined level in an event of collision, the loops or stitches of the fabric are brought out of balance with the coating layer to create openings, so that the internal pressure reduces due to the increased air permeability. The free stretching of the fabric further enables the bag to deform and thereby mitigate energy of impact. Due to the provision of macropores in the coating layer, the composite material forming the air bag of this invention has increased air permeability, while the free stretching allowing for the deformation of the bag assures snug-fit contact between the bag and the human body. As a result, the bag has high ability to absorb the energy of impact.

Because of the stretchability, the air bag readily fits the human body upon contact therewith without exercising a localized impactive force on the body. Further when the human body strikes against the air bag, the energy of movement of the body will be absorbed by the bag due to the compression or release of air. The macropores render the air bag well stretchable under an external force and therefore readily expandable in its volumre, resulting in a relatively small increase in pressure.

At a greatly increased internal pressure, a rebound phenomenon will take place. To prevent this, it is necessary to release the air upon the absorption of energy so as to lower the internal pressure quickly. In this respect, the macroporous elastomer coating layer in the air bag of this invention ruptures locally under the action of the stretchable base material to release the air. Adjustment of a very small degree of air permeability can be made by varying the size and number of the micropores.

According to the second feature of this invention, useful examples are given below, in which percentages are all by weight.

EXAMPLE 9

A 32 gauge tricot fabric made of 30d nylon multifilament was coated by a doctor with a resin solution consisting of 25% of polyurethane elastomer ("Paraprene 26S," trade name, product of Japan Polyurethane Co. Ltd.), 10% of sodium bicarbonate and 65% of DMF at a rate of 160 g/m². The coated fabric was then immersed in an acid bath containing 1.3 % of HCl and 98.7% of water at 40°C for 5 minutes to cause sodium bicarbonate to react with the acid. After neutralization conducted in a usual manner, the fabric was thoroughly washed with warm water and cool water and dried. The composite material thus prepared was sewn into a cylindrical shape to obtain an air bag, which was not satisfactorily macroporous but was rather rough and hard.

EXAMPLE 10

The same base material as used in Example 9 was coated with a resin solution of the same composition under the same conditions as in Example 9. The coated material was then immersed in an acid bath containing 1.3% of HCl, 75% of DMF and 23.7% of water under the same conditions, followed by the same treatment as in Example 9. The air bag obtained was found to be macroporous and more pliable than that of Example 9.

EXAMPLE 11

The same base material as used in Example 9 was coated with a resin solution of the same composition under the same conditions as in Example 9. The coated material was then immersed in an acid bath containing 1.5% of $H_2SO_4$, 60% of DMF and 38.5% of water under the same conditions, followed by the same treatment as in Example 9, whereby the same air bag as in Example 10 was obtained.

EXAMPLE 12

A knitted fabric made of 50d polyester multifilament using 1200 circular rib knitting needles was coated by a doctor with a resin solution consisting of 27% of polyurethane elastomer ("Paraprene 26S"), 6% of sodium bicarbonate and 67% of DMF at a rate of 160 g/m². The coated fabric was then immersed in an acid bath containing 1.3% of HCl, 75% of DMF and 23.7% of water at 40°C for 5 minutes, followed by the same treatment and stitching as in Example 9, whereby a pliable air bag was obtained.

EXAMPLE 13

A base material the same as in Example 12 was coated by a doctor with a resin solution consisting of 27% of polyurethane elastomer ("Paraprene 26S"), 10% of sodium bicarbonate and 63% of DMF Under the same conditions as in Example 12. The coated material was then immersed in an acid bath of the same composition as in Example 12 under the same conditions, followed by the same treatment and stitching. The air bag obtained was found to be more pliable than that of Example 12.

EXAMPLE 14

A half tricot fabric made of 210d nylon was coated by a doctor with a resin solution consisting of 25% of polyurethane elastomer, 10% of sodium bicarbonate and 65% of DMF at a rate of 160 g/m². The coated fabric was then immersed in an acid bath containing 1.3% of HCl, 75% of DMF and 23.7% of water at 40°C for 5 minutes for the removal of solvent and foaming reaction, followed by the same treatment as in Examples 9 to 13, whereby a composite material was obtained which was formed, as seen in Photograph 7, with micropores (circular black portions, magnified to 20X) distributed throughout its surface. The material was stitched as in Examples 9 to 13 to obtain an air bag which proved to be very effective.

While basic examples of this invention has been described, some alterations and modifications will be obvious to those skilled in the art. Accordingly, the invention is not limited to the foregoing examples but includes any desired changes and modifications within the scope of the invention as defined in the appended claims.

What we claim is:

1. A vehicle safety device comprising an inflatable confinement normally stored in a non-operating state and means coupled to the confinement to inflate the confinement, and wherein the confinement is adapted to receive an occupant when the occupant is moved relative to the vehicle upon the vehicle being abruptly brought to a halt; said confinement being made of a composite material comprising a gas permeable stretchable nylon or polyester knitted fabric and an elastomer coating layer on one surface of the knitted fabric and having microporous openings, the knitted fabric having higher stretchability than the elastomer coating layer such that the loops of the knitted fabric and the microporous openings of the elastomer coating layer are enlargeable by stretching as the confinement is inflated when the vehicle is brought to an abrupt halt to maintain the internal pressure of the inflated confinement at a substantially constant level, and at the time the occupant is forced into the inflated confinement in striking contact therewith are further enlargeable by the resulting energy of impact causing the formation of new openings in the elastomer coating by the difference in stretchability between the knitted fabric and the coating layer thereby maintaining the internal pressure of the confinement at a constant level.

2. A vehicle safety device comprising an inflatable confinement normally stored in a non-operating state and means coupled to the confinement to inflate the confinement, and wherein the confinement is adapted to receive an occupant when the occupant is moved relative to the vehicle upon the vehicle being abruptly brought to a halt; said confinement being made of a composite material comprising a gas permeable stretchable nylon or polyester knitted fabric and an elastomer coating layer on one surface of the knitted fabric and having macroporous openings, the knitted fabric having higher stretchability than the elastomer coating layer such that the loops of the knitted fabric and the macroporous openings of the elastomer coating layer are enlargeable by stretching as the confinement is inflated when the vehicle is brought to an abrupt halt to maintain the internal pressure of the inflated confinement at a substantially constant level, and at the time the occupant is forced into the inflated confinement in striking contact therewith are further enlargeable by the resulting energy of impact causing the formation of new openings in the elastomer coating by the difference in stretchability between the knitted fabric and the coating layer thereby maintaining the internal pressure of the confinement at a constant level.

3. The safety device of claim 1 wherein the elastomer is a poolyurethane or chlorinated polyethylene elastomer.

4. The safety device of claim 2 wherein the elastomer is a polyurethane or chlorinated polyethylene elastomer.

* * * * *